(12) United States Patent
Jeong et al.

(10) Patent No.: US 10,999,486 B2
(45) Date of Patent: May 4, 2021

(54) MONITORING APPARATUS AND MONITORING SYSTEM

(71) Applicant: HANWHA TECHWIN CO., LTD., Seongnam-si (KR)

(72) Inventors: Kyoung Jeon Jeong, Seongnam-si (KR); Yoo Mi Cha, Seongnam-si (KR); Sung Pil Chun, Seongnam-si (KR); Dong Won Kim, Seongnam-si (KR); Chang Hee Song, Seongnam-si (KR); Mi Na Choi, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/063,946

(22) PCT Filed: Jul. 22, 2016

(86) PCT No.: PCT/KR2016/007988
§ 371 (c)(1),
(2) Date: Jun. 19, 2018

(87) PCT Pub. No.: WO2017/213288
PCT Pub. Date: Dec. 14, 2017

(65) Prior Publication Data
US 2020/0288056 A1 Sep. 10, 2020

(30) Foreign Application Priority Data
Jun. 8, 2016 (KR) .................. 10-2016-0070880

(51) Int. Cl.
*H04N 5/232* (2006.01)
*H04N 5/225* (2006.01)
(Continued)

(52) U.S. Cl.
CPC ......... *H04N 5/232* (2013.01); *G06F 3/04842* (2013.01); *G06T 5/006* (2013.01);
(Continued)

(58) Field of Classification Search
CPC .... H04N 5/23216; H04N 7/183; G06T 5/006; G06F 3/04842
See application file for complete search history.

(56) References Cited

U.S. PATENT DOCUMENTS

2005/0259118 A1    11/2005  Mojaver et al.
2008/0317376 A1*   12/2008  Kasperkiewicz ......... G06T 5/00
                                                              382/274
(Continued)

FOREIGN PATENT DOCUMENTS

CN   101188774 A   5/2008
CN   101241590 A   8/2008
(Continued)

OTHER PUBLICATIONS

International Search Report (PCT/ISA/210), issued by International Searching Authority in corresponding International Application No. PCT/KR2016/007988, dated Mar. 6, 2017.
(Continued)

*Primary Examiner* — Nasim N Nirjhar
(74) *Attorney, Agent, or Firm* — Sughrue Mion, PLLC

(57) ABSTRACT

To solve the above problem, a monitoring apparatus according to an embodiment of the present invention comprises: a communication unit for receiving an original image acquired by a camera; a storage unit for storing the original image; a screen unit for displaying the original image and a corrected image obtained by dewarping the original image; and a control unit for controlling operations of the communication unit, the storage unit, and the screen unit, wherein the screen unit displays an icon in a dewarping area of the original
(Continued)

image where the corrected image is obtained by dewarping the original image, indicates that the dewarping area is selected when the icon located in the dewarping area is selected, and displays a polygon representing the selected dewarping area.

18 Claims, 19 Drawing Sheets

(51) Int. Cl.
G06F 3/0484 (2013.01)
G06T 5/00 (2006.01)
H04N 7/18 (2006.01)

(52) U.S. Cl.
CPC ....... *H04N 5/2254* (2013.01); *H04N 5/23216* (2013.01); *H04N 7/183* (2013.01)

(56) References Cited

U.S. PATENT DOCUMENTS

| | | | | |
|---|---|---|---|---|
| 2009/0289903 | A1* | 11/2009 | Chen | G06F 3/04883 |
| | | | | 345/173 |
| 2012/0233539 | A1* | 9/2012 | Reed | G06F 3/0488 |
| | | | | 715/234 |
| 2014/0184646 | A1* | 7/2014 | Liu | G06T 11/00 |
| | | | | 345/634 |
| 2016/0117853 | A1* | 4/2016 | Zhong | B64D 47/08 |
| | | | | 345/634 |
| 2019/0122332 | A1* | 4/2019 | Roulet | G06T 5/002 |

FOREIGN PATENT DOCUMENTS

| | | |
|---|---|---|
| JP | 2008301034 A | 12/2008 |
| JP | 2013236215 A | 11/2013 |
| JP | 2015046949 A | 3/2015 |
| KR | 100991104 B1 | 11/2010 |
| KR | 1020140137485 A | 12/2014 |
| KR | 101521008 B1 | 5/2015 |
| KR | 101619953 B1 | 5/2016 |

OTHER PUBLICATIONS

Communication dated Apr. 9, 2020, from the State Intellectual Property Office of People's Republic of China in counterpart Application No. 201680074236.7.

Communication dated Sep. 14, 2020, from the State Intellectual Property Office of People's Republic of China in counterpart Application No. 201680074236.7.

* cited by examiner

MONITORING APPARATUS AND MONITORING SYSTEM

CROSS-REFERENCE TO THE RELATED APPLICATION

This application is a U.S. national stage application under 35 U.S.C. § 371 of International Patent Application No. PCT/KR2016/007988, filed on Jul. 22, 2016, which claims priority from Korean Application No. 10-2016-0070880 filed on Jun. 8, 2016 in the in the Korean Intellectual Property Office, the disclosure of which is incorporated herein in its entirety by reference.

BACKGROUND

1. Field

Example embodiments of the present invention relates to a monitoring apparatus and monitoring system, and more particularly, to a monitoring apparatus and monitoring system which allows a user to more easily match a corrected image and an area of a corresponding original image, while not interrupting the user's monitoring of the original image even when the number of polygons displayed on the original image is increased as the number of corrected images is increased.

2. Description of the Related Art

Generally, surveillance systems are widely used in various places including, for example, banks, department stores, and residential areas. The surveillance systems may be used for crime prevention and security purposes, but the surveillance systems have also recently been used for real-time monitoring of indoor pets or children. The most commonly used system as a surveillance system is a closed circuit television (CCTV) in which a camera is installed in a proper position to capture images of a desired surveillance area so that a user can keep surveillance by monitoring the images captured by the camera.

A general forward facing camera, however, has a limited angle of view, and thus, it is easy to miss an object desired to be monitored when the object moves or deviates from the angle of view. Even when the camera provides pan, tilt, and zoom (PTZ) functions, the user has to manually issue instructions, or even when the camera automatically performs the PTZ functions, it is highly likely for the camera to miss the object desired to be monitored when the object moves relatively quickly.

Therefore, the use of surveillance systems that can monitor using a fisheye camera has recently been increasing. The fisheye camera is a camera equipped with a fisheye lens having a wide angle of view of about 180 degrees, or an angle of view wider than 180 degrees. In addition, a 360-degree camera has recently been introduced in which two fisheye lenses are mounted facing each other so that the camera can capture images in any direction without having to pan or tilt. Using a fisheye lens is very effective in surveillance systems because a blind spot of the camera can be reduced or minimized, and the camera may not miss the objects desired to be monitored.

As technologies related to the fisheye lens have been developing, interest in methods of monitoring images captured by the fisheye lens is also increasing. An original image of a fisheye image acquired by the fisheye camera has an advantage of having a wide angle of view, but it is not optimized for a human visual system, causing inconvenience for the user to monitor the fisheye image acquired. To solve this problem, it is necessary to generate a corrected image by performing dewarping of the fisheye image to improve or optimize the original fisheye image to the human visual system.

Since the corrected image shows a specific area in detail, when an event occurs, it is easier to observe the event in detail. Since the original image has a wide angle of view, it is easier to identify an occurrence position of the event when the event takes place. Thus, generally, the original image and the corrected image are often displayed together.

When an original image and a corrected image are displayed together, a user does not often identify which area of the original image is dewarped into the corrected image and displayed. More specifically, when an event occurs in the corrected image, it is not easy for a user to immediately match the corrected image and a corresponding area of the original image, in an attempt to check an event occurrence position within the original image.

In order to solve this problem, the present disclosure is directed to a monitoring apparatus allowing a user to more easily match a corrected image and a corresponding area in an original image.

In addition, the present disclosure is directed to a monitoring apparatus which does not interrupt a user's monitoring of the original image even when the number of polygons displayed on the original image increases as the number of corrected images increases.

Also, the present disclosure is directed to a monitoring system capable of improving the user's convenience when monitoring images using the monitoring apparatus.

However, the problems sought to be solved by the present invention are not limited to the above-described problems. Other problems, which are sought to be solved by the present disclosure but are not described herein, can be clearly understood by those skilled in the art from the descriptions below.

SUMMARY

One or more example embodiments provide a monitoring apparatus and monitoring system.

According to an aspect of an example embodiment, there is provided a monitoring apparatus including a communication interface configured to receive an original image acquired by a camera, a storage configured to store the original image, a display configured to display the original image and a corrected image obtained by dewarping the original image, and a controller configured to control the communication interface, the storage, and the display, wherein the display is further configured to display an icon located in a dewarping area corresponding to the corrected image obtained by dewarping the original image, select, in response to the icon being selected, the dewarping area in which the icon is located, and display a polygon surrounding the selected dewarping area.

The display may be further configured to display a shading on an area of the original image except the selected dewarping area.

The display may be further configured to display a border surrounding a corrected image corresponding to the selected dewarping area.

The corrected image may include a plurality of corrected images corresponding to a plurality of dewarping areas, and the display may be further configured to display a shading on the plurality of corrected images except a corrected image corresponding to the selected dewarping area.

The corrected image may include a plurality of corrected images corresponding to a plurality of dewarping areas, and a number of icons and a number of the plurality of dewarping areas are the same as a number of the plurality of corrected images.

The display may be further configured to display the original image disposed at one side of the display and the plurality of corrected images disposed at another side of the display.

The monitoring apparatus, wherein, when a first dewarping area comprises a second dewarping area, the display may be further configured to display a first icon located in the first dewarping area and a second icon located in the second dewarping area, the first icon and the second icon overlapping at one or more points.

The monitoring apparatus, wherein, when a first dewarping area comprises a second dewarping area, the display is further configured to display a first icon located in the first dewarping area, the first icon comprising a second icon located in the second dewarping area.

The one icon may be selected by a mouseover when the monitoring apparatus allows an input through a mouse, and is selected by tapping when the monitoring apparatus provides a touch function.

The display may be further configured to display a polygon surrounding another dewarping area adjacent to the selected dewarping area in response to the icon being selected and held by at least one of the mouseover and the tapping.

The monitoring apparatus, wherein, in response to the icon being selected, the display may be further configured to display the polygon and not display the selected icon.

According to an aspect of an example embodiment, there is provided a monitoring system including a fisheye camera configured to acquire an original image, and a monitoring apparatus configured to receive and display the original image acquired by the fisheye camera, wherein the monitoring apparatus includes a communication interface configured to receive the original image acquired by the fisheye camera, a storage configured to store the original image, a display configured to display the original image and a corrected image obtained by dewarping the original image, and a controller configured to control the communication interface, the storage, and the display, wherein the display is further configured to display an icon in a dewarping area in which the corrected image obtained by dewarping the original image is located, select, in response to the icon being selected, the dewarping area in which the icon is located, and display a polygon surrounding the selected dewarping area.

The display may be further configured to display a shading on an area of the original image except the selected dewarping area.

The display may be further configured to display a border surrounding a corrected image corresponding to the selected dewarping area.

The monitoring system, wherein the corrected image comprises a plurality of corrected images corresponding to a plurality of dewarping areas, and a numbers of icons and a number of the plurality of dewarping areas are the same as a number of the plurality of corrected images.

The monitoring system, wherein, in response to the icon being selected, the display may be further configured to display a shading on the corrected image except a corrected image corresponding to the selected dewarping area.

The monitoring system, wherein, when a first dewarping area comprises a second dewarping area, the display may be further configured to display a first icon located in the first dewarping area and a second icon located in the second dewarping area, the first icon and the second icon overlapping at one or more points.

The monitoring system, wherein the icon may be selected by a mouseover when the monitoring apparatus allows an input through a mouse, and when the icon is clicked and held by the mouse, the display may be further configured to display a polygon surrounding another dewarping area adjacent to the selected dewarping area.

The monitoring system, wherein, in response to the icon being selected, the display may be further configured to display the polygon and not display the selected icon.

The monitoring system, wherein a direction of the selected icon may correspond to an orientation of a corrected image corresponding to the selected dewarping area.

BRIEF DESCRIPTION OF THE DRAWINGS

The above and other aspects, features, and advantages of certain embodiments of the present disclosure will become apparent and more readily appreciated from the following description of the example embodiments, taken in conjunction with the accompanying drawings in which.

DETAILED DESCRIPTION

Hereinafter, various example embodiments of the present disclosure will be described in greater detail with reference to the accompanying drawings. These example embodiments are described in sufficient detail to enable those skilled in the art to practice the inventive concept, and it is to be understood that the example embodiments are not intended to limit the present disclosure to particular modes of practice, and it is to be appreciated that all modification, equivalents, and alternatives that do not depart from the spirit and technical scope of the present disclosure are encompassed in the present disclosure.

Unless otherwise defined, all terms including technical and scientific terms and used herein have the same meaning as commonly understood by one of ordinary skill in the art. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

The terminology used herein is for the purpose of describing particular embodiments only and is not intended to be limiting of the present disclosure. As used herein, the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Terms including ordinals such as "first," "second" and the like used herein may be used to describe various elements, but the elements are not limited to the terms, and it is used only for the purpose of distinguishing one component from another. For example, the first component may be referred to as a second component, and similarly, the second component may also be referred to as a first component.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, exemplary embodiments of the present invention will be described in detail with reference to the accompanying drawings.

Figure 1:
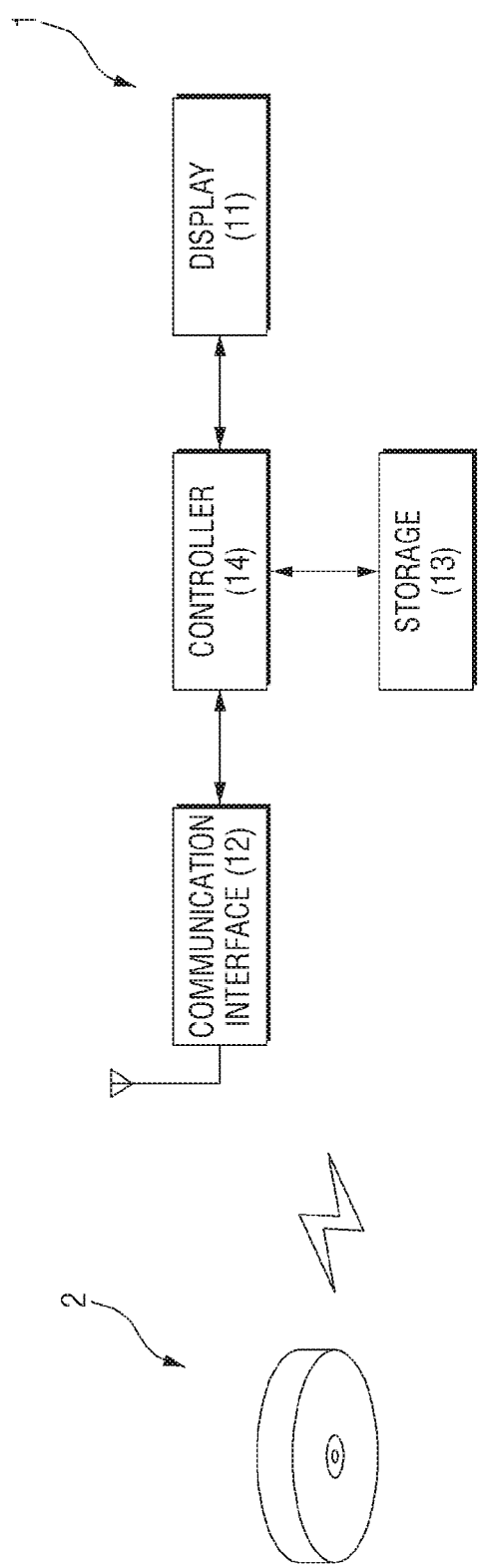
FIG. 1 is a block diagram illustrating a configuration of a monitoring system according to an example embodiment.

FIG. 1 is a block diagram illustrating a configuration of a monitoring system according to an example embodiment.

The monitoring system according to an example embodiment may include a camera 2 configured to capture a specific region in order to acquire images, and a monitoring apparatus 1 that receives and displays the images acquired by the camera 2. The camera 2 and the monitoring apparatus 1 may be connected by wired or wireless communication, and may transmit and receive image data or signals.

The camera 2 according to an example embodiment may be a fisheye camera 2 equipped with a fisheye lens 20 and the image acquired by the fisheye camera 2 is an original image 111. Here, the original image 111 refers to a fisheye image captured through the fisheye camera 2. The original image 111 may be subjected to image processing such as encoding, decoding and rendering in order to be displayed on the monitoring apparatus 1, but a dewarping operation for correcting distortions is not performed.

The monitoring apparatus 1 according to an example embodiment receives and displays the images acquired by the camera 2. The monitoring apparatus 1 may display the original image with a corrected image 112 obtained by dewarping the original image 111. The monitoring apparatus 1 may be an apparatus that is portable, such as a smartphone, a tablet personal computer (tablet PC), a laptop computer, or the like, but is not limited thereto, or may be an apparatus that is not portable, such as a desktop computer, a video wall, or the like.

As illustrated in FIG. 1, the monitoring apparatus 1 may include display 11 configured to display images, a communication interface 12 configured to receive images from the camera 2, a storage 13 configured to store the images, and a controller 14 configured to control the display 11, the communication interface 12, and the storage 13.

The display 11 displays the original image 111 and the corrected image 112. In addition, the display 11 displays an icon 113 and a polygon 114 corresponding to the corrected image 112 on the original image 111. Further, the display 11 provides various view modes for displaying the original image 111 and the corrected image 112. The icon 113, the polygon 114, and the view modes will be described in detail below.

The monitoring apparatus 1 may provide various input functions including, for example, a touch function. A separate input unit may also be provided such as, for example, a mouse, a keyboard, a joystick, a remote controller, and the like. When the monitoring apparatus 1 provides a touch function, the display 11 may include a touch sensor. The touch sensor is integrally mounted on the display 11, senses a touch generated in the display 11 to detect coordinates of a region in which the touch has occurred, the number of touches, the intensity of touch, and the duration of the touch, and transmits a detection result to the controller 14. When the display 11 does not include a touch sensor even when the monitoring apparatus 1 provides a touch function, a separate touch pad may be provided as an input unit. The touch may be generated by a finger, but is not limited thereto, and may be generated using a stylus pen equipped with a tip, through which a minute current can flow, or the like.

The communication interface 12 may transmit and receive signals and data to and from the camera 2 in a wired/wireless manner. For example, the communication interface 12 modulates and frequency-upconverts signals or data received from the controller 14 and transmits resulting signals or data, or frequency-downconverts and demodulates the signals or data received from the camera 2 and provides resulting signals or data to the controller 14. Through these procedures, the communication interface 12 may receive the image data or signals from the camera 2, or may transmit the signals or data generated by the controller 14 to the camera 2. The communication interface 12 may include any one or any combination of a digital modem, a radio frequency (RF) modem, a WiFi chip, and related software and/or firmware.

The storage 13 stores programs for processing and controlling operations of the monitoring apparatus 1 and a variety of data generated while each of the programs is being executed, the original image 111 transmitted through the camera 2 and the corrected image 112 obtained by dewarping the original image 111. The storage 13 may be embedded in the monitoring apparatus 1, and in the case of a network camera system, a separate device, such as a network video recorder (NVR) or the like, may be provided.

The controller 14 controls the overall operation of the monitoring apparatus 1. For example, the controller 14 may perform processing and controlling for signal and data communication between the communication interface 12 and the camera 2, and may perform image processing, such as decoding and rendering, when images are received through the communication interface 12. In addition, when a user's instruction is input, the controller 14 processes the instruction to control the display 11 to display the icon 113 and the polygon 114, stores the image in the storage 13, and controls the stored image to be loaded. As the controller 14 according to an example embodiment, the controller 14 may be embodied as various numbers of hardware, software and/or firmware structures that execute the above-described functions described above. For example, the controller 14 may use a direct circuit structure, such as a memory, a processor, a logic circuit, a look-up table, etc. that may execute the above-described functions through controls of one or more microprocessors or other control apparatuses. Also, the controller 14 may be specifically embodied by a module, a program, or a part of code, which contains one or more executable instructions for performing specified logic functions, and executed by one or more microprocessors or other control apparatuses. The controller 14 may further include or may be implemented by a processor such as a central processing unit (CPU) that performs the above-described functions, a microprocessor, or the like. Further, although a bus is not illustrated in FIG. 1, communications between the controller 14, the storage 13, the display 11 and the communication interface 12 may be performed through the bus.

Figure 2:
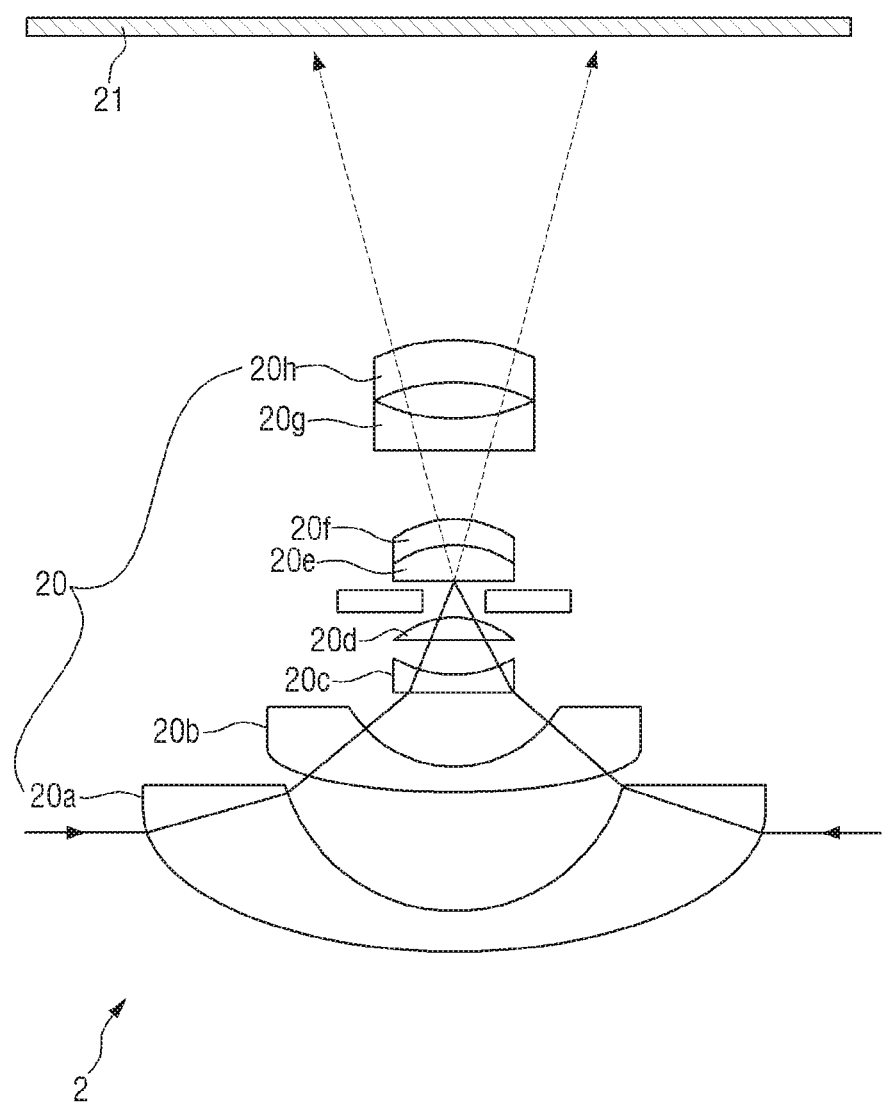
FIG. 2 is a diagram illustrating a configuration of a fisheye lens used in a fisheye camera that captures an original image according to an example embodiment.

FIG. 2 is a diagram illustrating a configuration of the fisheye lens 20 used in the fisheye camera 2 that captures an original image 111 according to an example embodiment.

As described above, the camera may be a fisheye camera 2. Alternatively, the camera may be a 360-degree camera. The 360-degree camera is a camera which is equipped with a plurality of fisheye lenses 20 and is capable of capturing images in any direction without having to directly pan or tilt the camera. The camera 2 according to an example embodiment is not limited to the above examples, and may be any type of camera as long as the camera uses the fisheye lens 20 so the original image 111 is distorted and needs to be corrected to some extent.

As shown in FIG. 2, the fisheye lens 20 is formed by stacking at least 6 to 10 or more lens elements 20a to 20h so the fisheye lens 20 has an angle of view of 180 degrees or more. These various lens elements 20a to 20h include convex and concave lenses, and also include spherical and aspherical lenses. As shown in FIG. 2, light rays incident to the outermost lens element at 180 degrees are irradiated to an image pickup element 21 after passing through all the lens elements 20a to 20h. The image pickup element 21 generates different signals according to wavelengths of the irradiated light rays, thereby converting information of an image into an electrical signal. In this case, the image pickup element 21 may be a camera element, such as a general complementary metal oxide semiconductor (CMOS) element, a charge-coupled device (CCD) element, or the like, which is capable of capturing images of a subject. The fisheye lens 20 may be installed in the fisheye camera 2 according to an example embodiment.

An image generated using the fisheye lens 20 provides a wide angle of view, but a distortion caused by refraction increases toward an edge area of the image which is distant from an optical axis. Therefore, a subject near the center of a lens appears larger while a peripheral subject appears smaller. Although it may be possible to use such a distorted image without changes, there are many cases where it is necessary to correct the distorted image in some specific fields of application. Correcting the distorted original image 111 generated by the fisheye lens 20 as described above is generally referred to as "distortion calibration" or "dewarp," and dewarping is performed through an appropriate equation using parameters, such as a focal length or an optical center position of the fisheye lens 20, according to a projection method used for the fisheye lens 20.

The most common method for camera linear distortion-free mapping is a perspective projection ($Rf=f\times\tan(\theta)$) method. This is a method of locating and mapping a point in a perspective image captured by a general camera. In addition, there is a linear-scaled projection ($Rp=f\times\theta$) method as the simplest mapping function for the fisheye lens 20. This is a method of finding a radiation position of a point in the original image 111 captured through the fisheye lens 20. In order to correct the distorted original image 111, the actual original image 111 is converted to a perspective image and then mapped. Thus, the distortion of the original image 111 may be corrected by solving the two simultaneous equations defining the above-mentioned perspective mapping and the fisheye mapping to find the relationship between Rf and Rp.

The original image 111 may be transmitted to the monitoring apparatus 1 and then corrected through software in the above-described manner. Recently, however, a technique has been introduced in which a chip for correcting the distortion of the original image 111 is mounted inside the fisheye camera 2. The chip is a system-on-chip (SoC), in which a plurality of semiconductor components constitute one system and the one system may be integrated as one chip. Alternatively, the chip may be an image signal processing (ISP) chip, which may use a hardware-processing method. When the original image 111 is dewarped autonomously by the camera 2 as described above, software for dewarping does not need to be installed in the monitoring apparatus 1 that receives the image from the camera 2. Therefore, when one camera 2 transmits an image to a plurality of monitoring apparatuses 1, dewarping is possible without having to install software in all of the monitoring apparatuses 1, and thereby corrected images 112 can be immediately displayed. According to an example embodiment, the monitoring apparatus 1 may be able to dewarp the original image 111 into the corrected image 112 through software, and the camera 2 may autonomously perform a dewarping operation.

Figure 3:
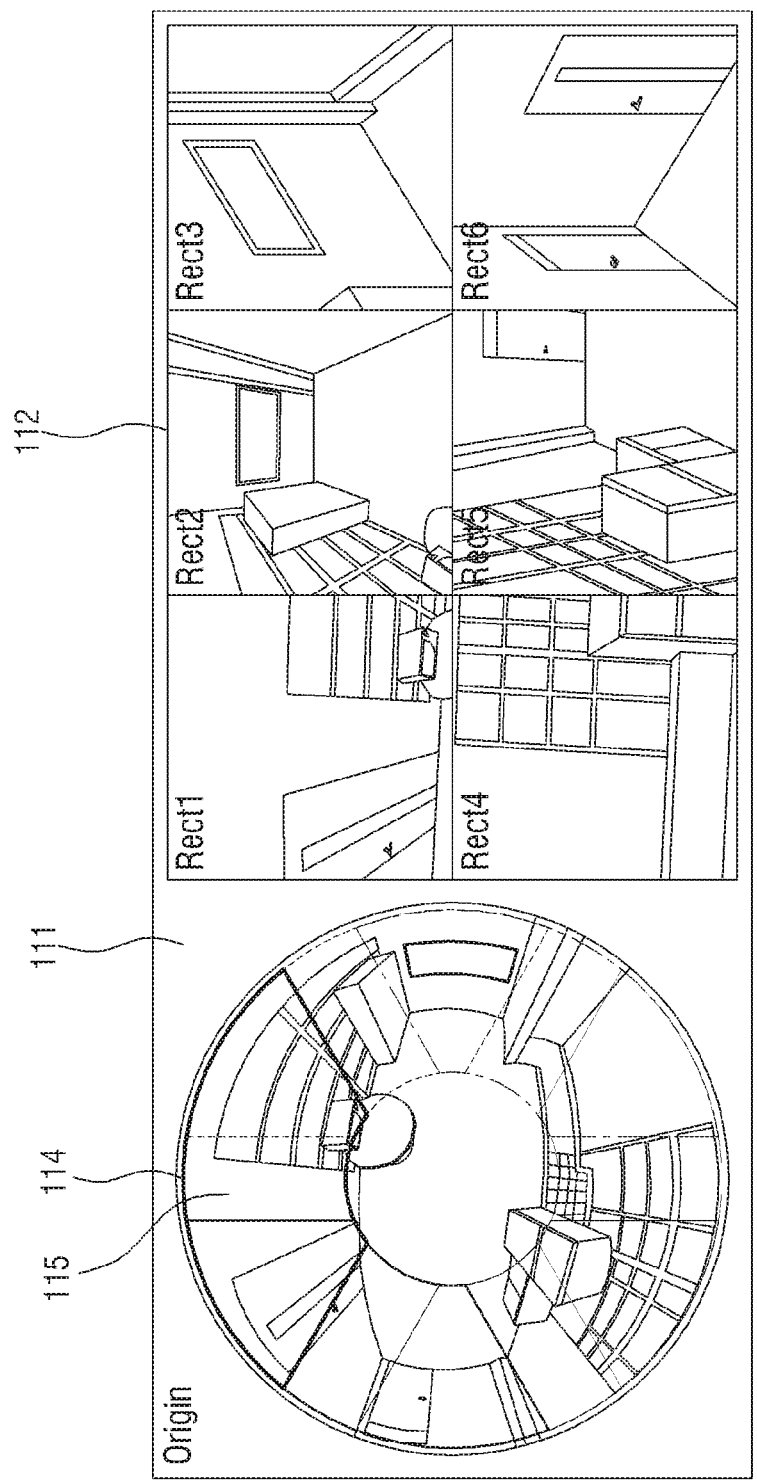
FIG. 3 is a diagram illustrating an example in which an original image captured by a fisheye camera and corrected images are displayed through a display of a monitoring apparatus according to an example embodiment.

FIG. 3 is a diagram illustrating an example in which an original image 111 captured by a fisheye camera 2 and corrected images 112 are displayed through a display 11 of a monitoring apparatus 1.

Generally, a viewer program is installed in the monitoring apparatus 1 in order to display the original image 111 and the corrected images 112 on the display 11. In addition, the viewer program provides various view modes. The view modes refer to various modes through which a plurality of images are displayed, and a user may select one of the various view modes to view the original image 111 and/or the corrected images 112.

For example, in one view mode, as shown in FIG. 3, the original image 111 is displayed on the left side and a plurality of corrected images 112 are displayed on the right side. The corrected images 112 are displayed by dewarping a specific area of the original image 111. Therefore, when there are a plurality of corrected images 112, a plurality of dewarping areas 115 corresponding to the corrected images 112 also exist. In FIG. 3, six corrected images 112, that is, six divided images are shown, but in other view modes, various numbers of corrected images 112, such as four divided images or nine divided images, may be displayed. Alternatively, in another view mode, only the original image 111, without the corrected images 112, may be displayed, or in another view mode, only the corrected images 112, without the original image 111, may be displayed. That is, various view modes may be available without limitation as long as the view modes are supported by the viewer program. Hereinafter, the view mode according to an example embodiment will be described as displaying a single original image 111 along with the plurality of corrected images 112. However, this is merely for the purpose of convenience of description, and does not limit the scope of the present disclosure.

In the case in which the original image 111 and the corrected images 112 are displayed together, a polygon 114 that represents the dewarping area 115 corresponding to one of the corrected images 112 is displayed on the original image 111, as shown in FIG. 3. The polygon 114 is formed in the form of a single closed curve to surround the dewarping area 115 of the original image 111. The corrected images 112 and the dewarping areas 115 correspond to each other, and hence the number of the corrected images 112 is the same as the number of the dewarping areas 115. Accordingly, the number of polygons 114 is the same as the number of the corrected images 112.

Here, the dewarping area 115 is an area in the original image 111 corresponding to the corrected image 112. More specifically, when the corrected images 112 are generated by dewarping the original image 111, the entire original image 111 is not converted into a single corrected image 112. This is because an angle of view of the original image 111 and an angle of view of each of the corrected images 112 are different from each other. Thus, the corrected image 112 is generated from a partial area of the original image 111, and the partial area of the original image 111 is referred to as the dewarping area 115.

Colors of lines may be different for every polygon 114, and colors of borders 116 surrounding the corrected images 112 may be different from each other. In addition, the color of the polygon 114 may match the color of the border 116 surrounding the corrected image 112 that corresponds to the dewarping area 115 enclosed by the polygon 114. Therefore, even when a plurality of corrected images 112 and a plurality of polygons 114 are displayed, the user may more easily match the corrected images 112 and the corresponding dewarping areas 115. However, as the number of corrected images 112 increases, the user may have more difficulty in matching the corrected images 112 and the corresponding dewarping areas 115. In addition, as the number of corrected images 112 increases, the number of polygons 114 also increases, which may interrupts the user's viewing of the original image 111.

Figure 4:
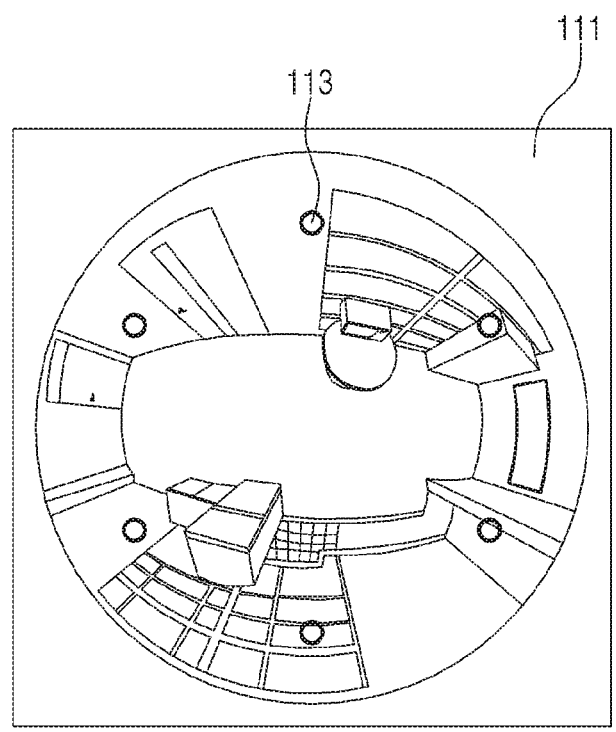
FIG. 4 is a diagram illustrating an example icon displayed on an original image according to an example embodiment.

FIG. 4 is a diagram illustrating icons 113 displayed on an original image 111 according to an example embodiment.

Figure 5:
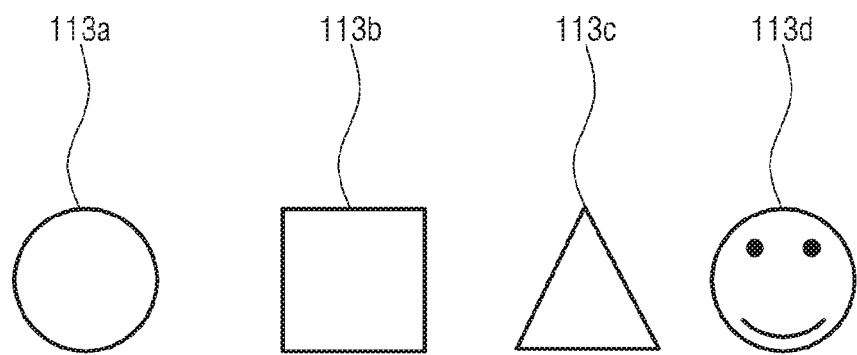
FIG. 5 is a diagram illustrating example shapes of the icon shown in FIG. 4 according to example embodiments.

FIG. 5 is a diagram illustrating various shapes of the icons 113 shown in FIG. 4 according to example embodiments.

According to an example embodiment, a polygon 114 may not be initially displayed on the original image 111, but the icons 113 may be displayed first, as shown in FIG. 4. Here, the icons 113 may have a circular shape, as shown in FIG. 4, but is not limited thereto, and the icons 113 may have various shapes, such as a rectangle 113b, a triangle 113c, an emoticon 113d, and the like, as shown in FIG. 5.

As described above, a view mode according to an example embodiment may be a view mode displaying the single original image 111 and a plurality of corrected images 112 together. Thus, although the plurality of corrected images 112 are not shown in FIG. 4, these are simply omitted and the same applies for the subsequent drawings.

The icons 113 may be located approximately at the center of the dewarping area 115. Coordinates of the center of the dewarping area 115 may be approximately calculated using the width, height, or the like of the dewarping area 115 according to the shape of the dewarping area 115.

The icons 113 may be located in the dewarping area 115, so a user may identify which area of the original image 111 is being displayed by the corrected images 112. However, since the polygon 114 is not yet displayed on the original image 111, the user may only know an approximate location of the dewarping area 115, and may not know a precise boundary or range of the dewarping area 115.

Because the number of the corrected images 112 is the same as the number of the dewarping areas 115, the number of icons 113 is also the same as the number of the corrected images 112. In addition, a size of the icon 113 may be very small as shown in FIG. 4 so the icons 113 do not interrupt the user's viewing of the original image 111 even when a plurality of icons 113 are displayed in the original image 111.

Meanwhile, a width of the dewarping area 115 varies according to magnification of the corrected image 112, that is, a zoom value. As the corrected image 112 is zoomed in, the width of the dewarping area 115 becomes narrower, and as the corrected image 112 is zoomed out, the width of the dewarping area 115 becomes wider. According to an example embodiment, the size of the icon 113 may change in proportion to the width of the dewarping area 115.

Figure 6:
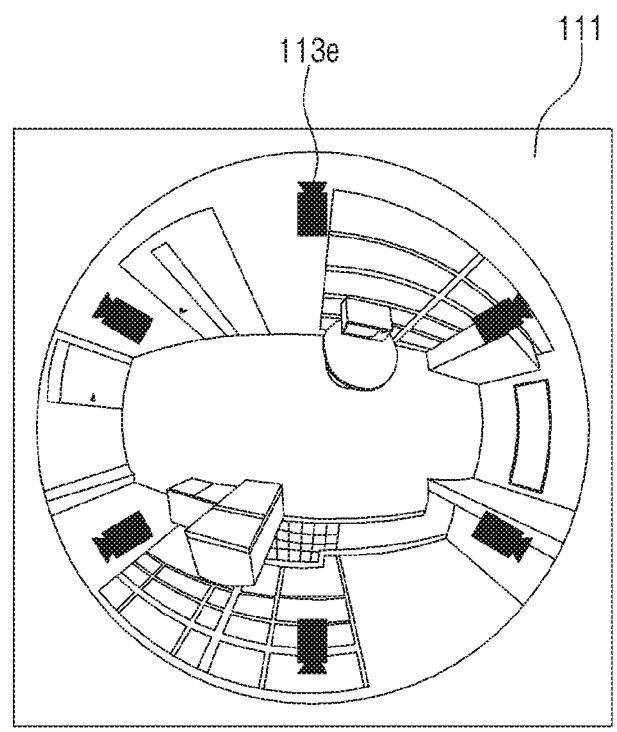
FIG. 6 is a diagram illustrating the icon of FIG. 4 that has a different shape and is displayed on the original image according to an example embodiment.

FIG. 6 is a diagram illustrating the icon 113 of FIG. 4 that has a different shape and is displayed on an original image 111.

According to an example embodiment, icons 113e may be a shape of a camera, as shown in FIG. 6. In this case, unlike the shapes of the icons shown in FIG. 5, the icon 113e may allow a user to recognize not only the location but also the orientation of the dewarping area 115.

While corrected images 112 are generated by dewarping the original image 111, when a user views the corrected images 112, the corrected images 112 appear as being captured using a general camera, rather than the fisheye camera 2. Referring to FIG. 6, the icons 113e displayed on the original image 111 have an ordinary camera shape as shown in FIG. 6 and directions in which the camera shape icons 113e face are directions that an ordinary camera would have faced if the corrected images 112 were captured by the ordinary camera.

When the dewarping area 115 is located above an optical axis in the original image 111, the corrected image 112 is panned to the left when the user moves the icon 113 to the left. However, when the dewarping area 115 is located below the optical axis in the original image 111, the corrected image 112 is panned to the right when the user moves the icon 113 to the right.

When the icon 113e has a shape of a camera as shown in FIG. 6, even when the corrected image 112 is panned to the right when the user moves the icon 113e to the left, the user's experience of the directionality may be improved by observing the direction in which the camera shape icons 113e face. The shape of the icons 113e according to an example embodiment is not limited to the shape of a camera, but may be variously formed as long as the shape indicates a specific direction.

Figure 7:
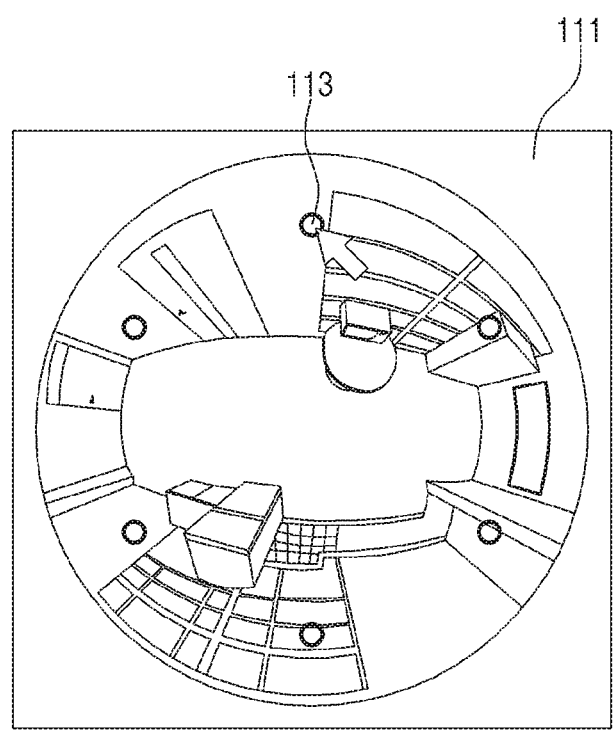
FIG. 7 is a diagram illustrating an image in which an icon is selected according to an example embodiment.
Figure 8:
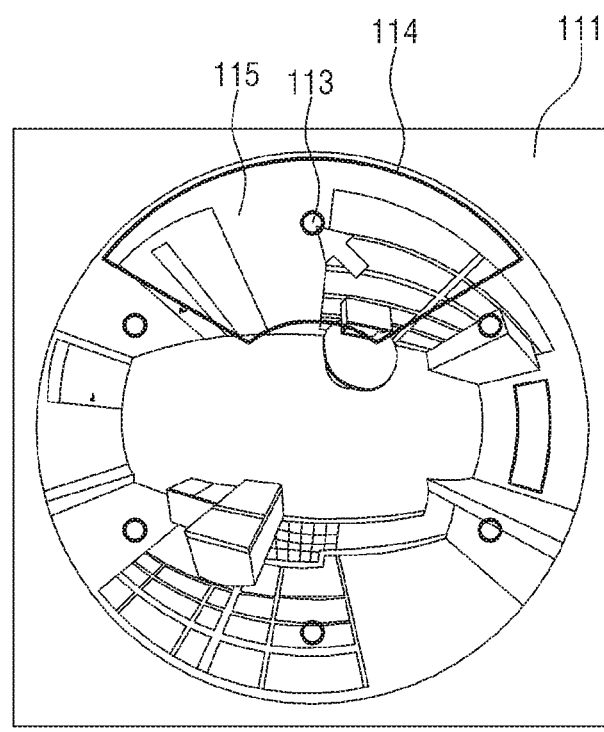
FIG. 8 is a diagram illustrating a polygon displayed in a specific area of an original image according to an example embodiment.

FIG. 7 is a diagram illustrating an image in which an icon 113 is selected according to an example embodiment, and FIG. 8 is a diagram illustrating a polygon 114 displayed in a specific area of an original image 111 according to an example embodiment.

According to an example embodiment, as shown in FIG. 7, when a user selects the specific icon 113 on the original image 111, a dewarping area 115 in which the selected icon 113 is located is selected. In addition, as shown in FIG. 8, the polygon 114 surrounding a selected dewarping area 115 is displayed in order to inform the user of the selected dewarping area 115. That is, the polygon 114 is displayed in response to the icon 113 being selected, which allows the user to identify a boundary and range of the dewarping area 115.

When the user inputs an instruction via a mouse to the monitoring apparatus 1, the user may be able to select the icon 113 simply through a mouseover. The mouseover refers to placing a cursor of the mouse over a specific object without using a button on the mouse. However, aspects of example embodiments are not limited thereto, and the icon 113 may be selected by clicking the mouse. When the monitoring apparatus 1 provides a touch function, the user may perform "tap" with a finger to select the icon 113. Here, tapping is one of touch gestures, and may be applying a quick touch to the display 11 and then immediately releasing the touch.

Figure 9:
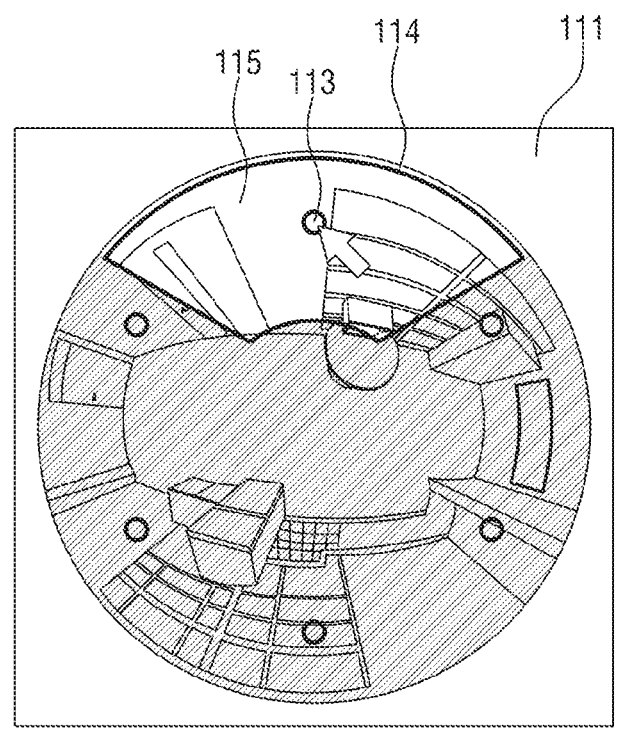
FIG. 9 is a diagram illustrating a polygon displayed in a specific area of an original image according to an example embodiment.

FIG. 9 is a diagram illustrating a polygon 114 displayed in a specific area of an original image 111 according to an example embodiment.

According to an example embodiment, in response to a user selecting a specific icon 113 in the original image 111, as shown in FIG. 7, the polygon 114 surrounding a selected dewarping area 115 is displayed, as shown in FIG. 9. In this case, an area of the original image 111 except the selected dewarping area 115 may be subjected to a shading process.

As shown in FIG. 8, when the shading process is not performed on the original image 111, the user may have difficulties in immediately recognizing a boundary and range of the dewarping area 115 when a line of the polygon 114 is relatively thin. On the contrary, when the line of the polygon 114 is relatively thick, the user may feel uncomfortable in viewing the original image 111 which may be blocked by the line of the polygon 114.

However, when the area except the selected dewarping area 115 is shaded as shown in FIG. 9, the user may more easily and immediately identify the boundary and range of the dewarping area 115. In addition, the shading of the original image 111 may be semi-transparent so the shaded area may be viewed by the user.

As shown in FIGS. 8 and 9, when the polygon 114 is displayed on the original image 111 in response to the icon 113 being selected, the icon 113 does not disappear from being displayed, but may be displayed with the polygon 114. But example embodiments are not limited thereto, and the icon 113 may disappear when the icon 113 is selected and the polygon 114 is displayed.

Figure 10:
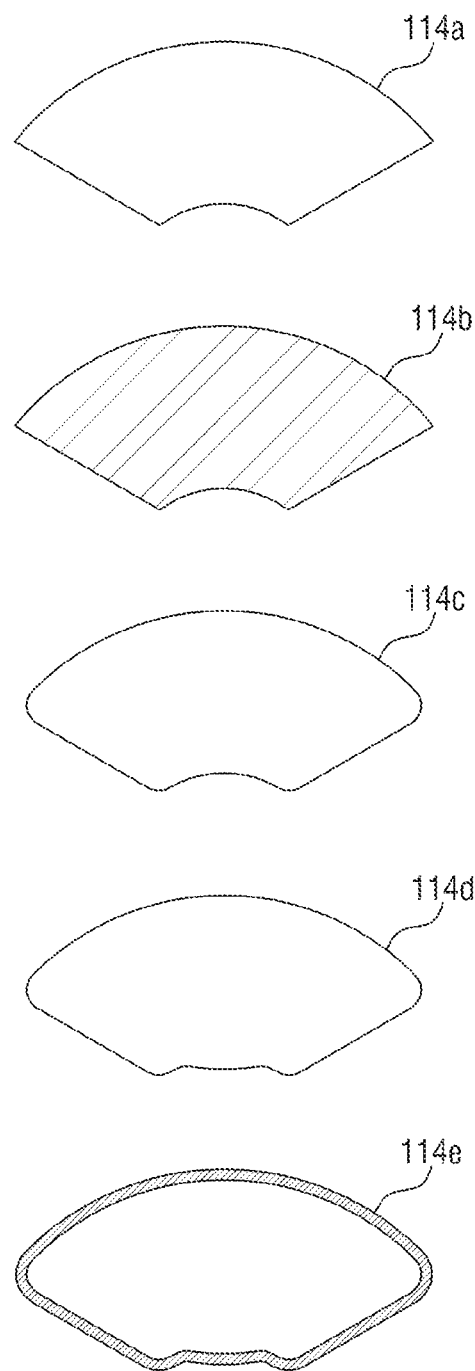
FIG. 10 is a diagram illustrating example shapes of the polygon shown in FIG. 8 according to example embodiments.

FIG. 10 is a diagram illustrating various shapes of the polygon 114 shown in FIG. 8 according to example embodiments.

As described above, a polygon 114 is displayed on an original image 111 in such a manner that it surrounds a selected dewarping area 115. In this case, the polygon 114 may surround the dewarping area 115 such that an area in which corrected images 112 are displayed corresponds exactly to the dewarping area 115. However, according to an example embodiment, the polygon 114 may roughly surround the dewarping area 115. This is because it may sometimes be more important to provide the user with comfortable aesthetics when viewing the image than to inform the exact boundary and range of the dewarping area 115. Therefore, according to example embodiments, the shape of the polygon 114 may be variously formed as shown in FIG. 10.

Figure 11:
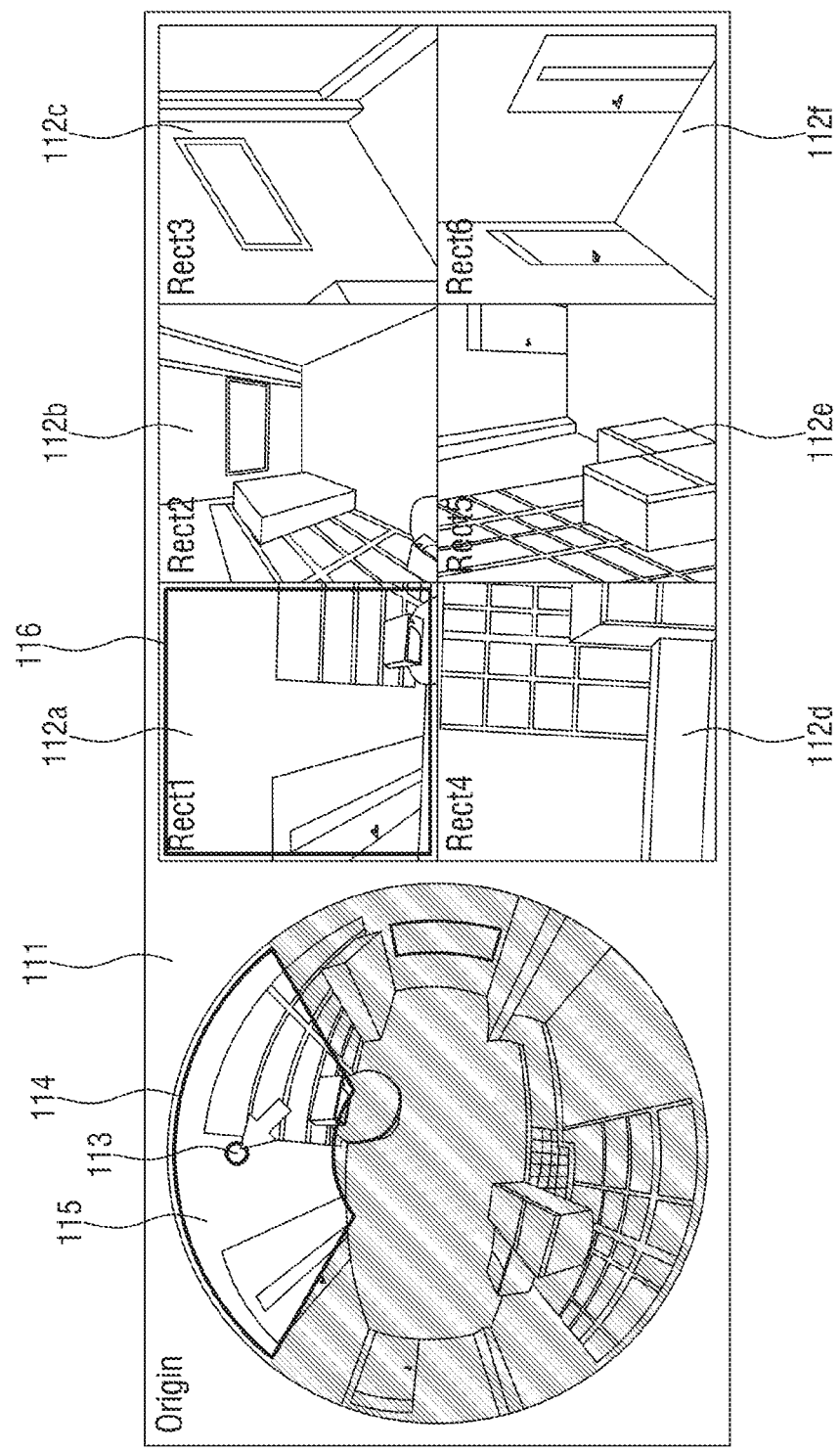
FIG. 11 is a diagram illustrating a state in which an original image and corrected images are displayed according to an example embodiment.

FIG. 11 is a diagram illustrating a state in which an original image 111 and collected images 112 are displayed according to an example embodiment.

As described above, the original image 111 and the corrected images 112 are displayed together, and especially when there are a plurality of corrected images 112, a plurality of dewarping areas 115 are formed and there are also formed a plurality of icons 113 located in the dewarping areas 115. According to an example embodiment, when the user selects one icon 113 from the original image 111, the dewarping area 115 in which the selected icon 113 is located is selected and the polygon 114 is displayed in the selected dewarping area 115.

Meanwhile, when the dewarping area 115 in which the polygon 114 is displayed is dewarped, a first corrected image 112a is generated. That is, the selected dewarping area 115 corresponds to the first corrected image 112a. In this case, as shown in FIG. 11, a border 116 is displayed around the first corrected image 112a. The border 116 is formed in the form of a single closed line to surround the first corrected image 112a. In addition, the border 116 informs of the specific corrected image 112 in which the area selected by the user is displayed among the plurality of corrected images 112. Therefore, the corrected image 112 is specified by the border 116 so that the user may more easily match the dewarping area 115 and the corrected image 112.

According to an example embodiment, the plurality of icons 113 may be formed in various colors. In addition, the borders 116 surrounding the corrected images 112 may be formed in various colors. In this case, the color of the icon 113 may match the border 116 of the corrected image 112 corresponding to the dewarping area 115 in which the icon 113 is located. Furthermore, the color of the icon 113 may match the color of the polygon 114 which is displayed when the icon 113 is selected.

Figure 12:
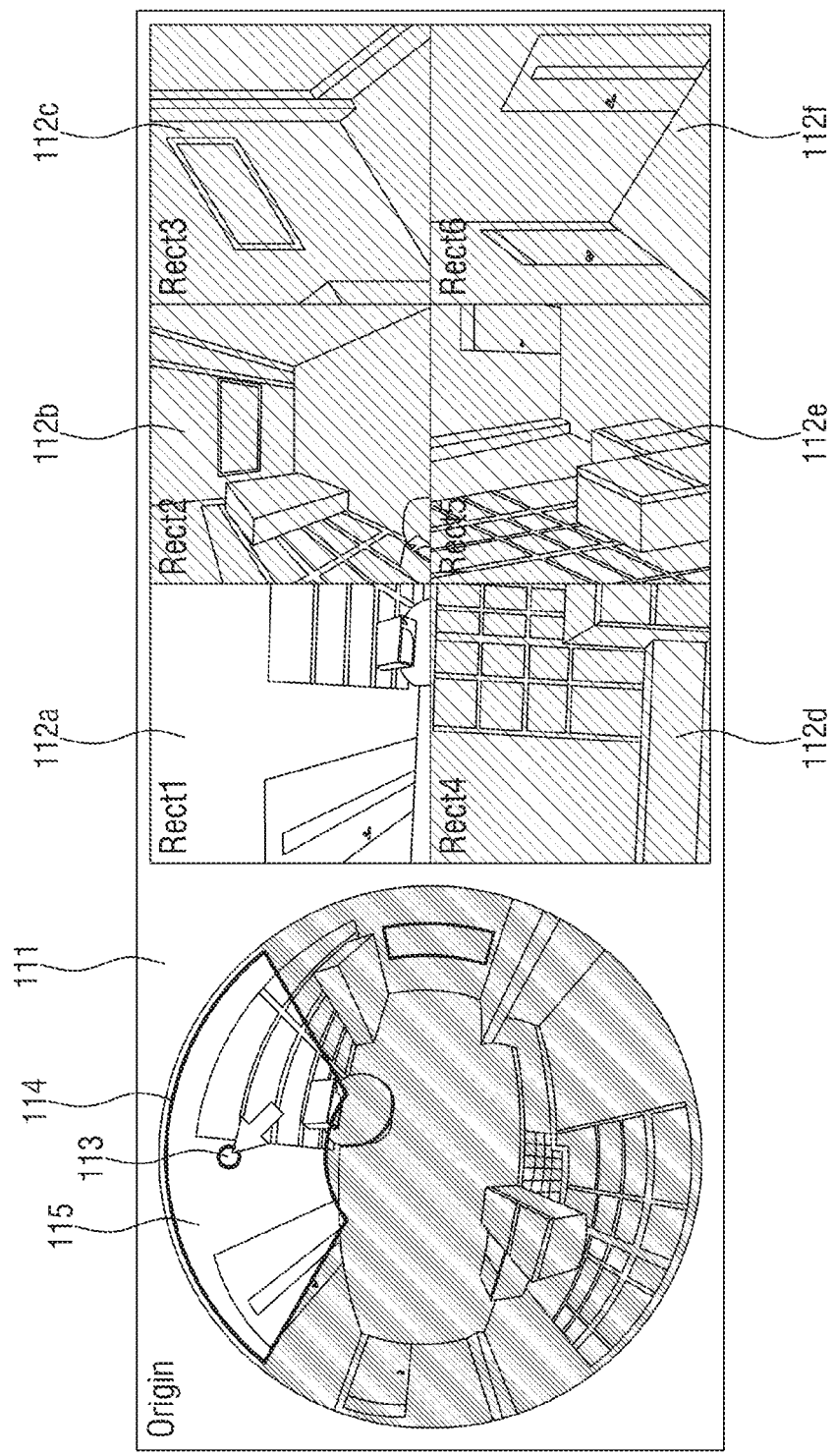
FIG. 12 is a diagram illustrating a state in which an original image and corrected images are displayed according to an example embodiment.

FIG. 12 is a diagram illustrating a state in which an original image 111 and corrected images 112 are displayed according to an example embodiment.

According to an example embodiment, when the user selects one icon 113 from the original image 111, a polygon 114 is displayed in the dewarping area 115 in which the selected icon 113 is located. In addition, an area of the original image 111, except the selected dewarping area 115, may be shaded.

When the dewarping area 115 in which the polygon 114 is displayed is dewarped, a first corrected image 112a is generated. That is, the selected dewarping area 115 correspond to the first corrected image 112a. In this case, as shown in FIG. 12, a second to sixth corrected images 112b to 112f, except the first corrected image 112a, may be shaded. In this manner, a specific corrected image 112 in which the area selected by the user is displayed among the plurality of corrected images 112 is informed. Thus, the corrected image 112 is specified by shading so the user may more easily match the dewarping area 115 and the corrected image 112.

Figure 13:
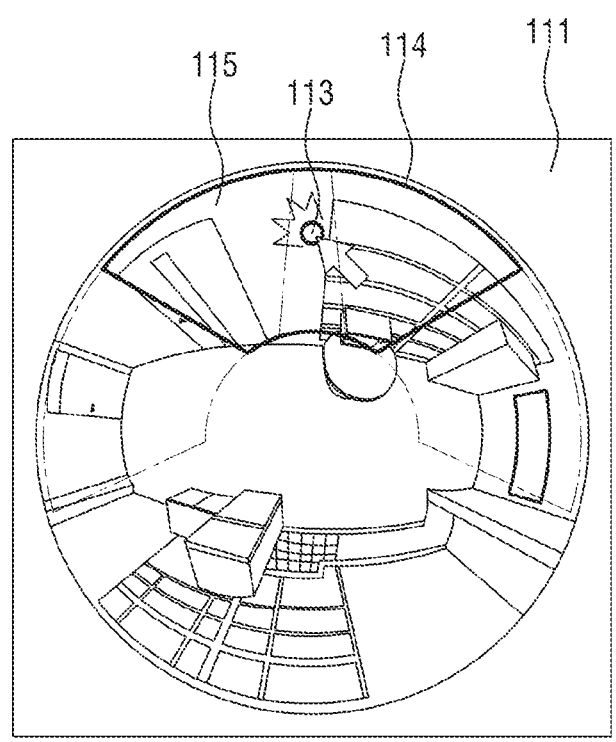
FIG. 13 is a diagram illustrating a state in which an icon is selected to be dragged according to an example embodiment.

FIG. 13 is a diagram illustrating a state in which an icon 113 is selected to be dragged according to an example embodiment.

Drag refers to a gesture of pulling a specific object from one point to another point to move the specific object on a display. An operation for dragging is different depending on whether a user's instruction is input to the monitoring apparatus 1 with a mouse or a touch input. When the user allows an instruction to be input to the monitoring apparatus 1 with a mouse, the user clicks and holds a specific object using a button on the mouse. Then, the user moves the specific object from one point to another point while holding the button of the mouse down. When the object reaches a desired point, the click is released.

When the monitoring apparatus 1 provides a touch function, the user touches and holds a specific object with a finger or the like. Then, the user pulls the specific object from one point to another point while keeping the finger or the like on the object. When the object reaches a desired point, the touch is released.

In order to drag the icon 113, a "click" of the mouse or a "touch" of a finger on the icon 113 is performed. In this case, as shown in FIG. 13, a polygon 114 is formed around a dewarping area 115 in which the selected icon 113 is located. At this point, polygons 114 are also formed around dewarping areas 115 near the selected dewarping area 115. The polygon 114 formed around the selected dewarping area 115 may be represented by a solid line and the polygons 114 formed around the dewarping areas 115 near the selected dewarping area 115 may be represented by a dashed line. Accordingly, the user is able to visually distinguish between the dewarping area 115 that is a current target of dragging and the adjacent dewarping areas 115.

Figure 14:
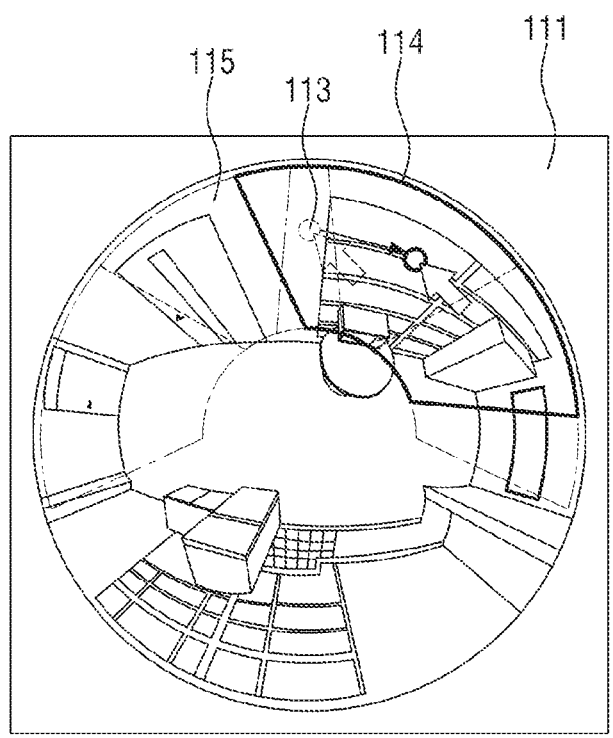
FIG. 14 is a diagram illustrating a state in which an icon is dragged according to an example embodiment.

FIG. 14 is a diagram illustrating a state in which an icon 113 is dragged according to an example embodiment.

The user holds a click of a mouse or a touch with a finger or the like on the icon 113. Then, as shown in FIG. 14, the user drags the icon 113 from one point to another point. Accordingly, a dewarping area 115 in which the icon 113 is located is also dragged and a corresponding corrected image 112 is panned or tilted.

When a plurality of corrected images 112 are generated from one original image 111, the user designates the dewarping area 115 in consideration of overlapping regions of the corrected images 112 in order to minimize blind spots. Therefore, when the user pans or tilts one corrected image 112 by dragging one icon 113, the user needs to know boundaries and ranges of adjacent dewarping areas 115, as well as those of the selected dewarping area 115. In this case, as described above, the polygons 114 are formed around the adjacent dewarping areas 115 so the user may visually distinguish between the dewarping area 115 that is a current target of dragging and the adjacent dewarping areas 115.

Figure 15:
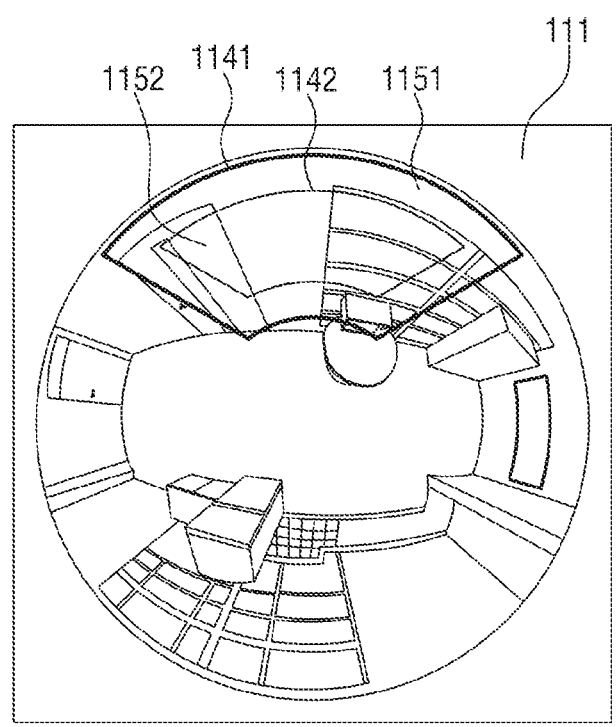
FIG. 15 is a diagram illustrating a state in which a first dewarping area and a second dewarping area overlap each other according to an example embodiment.

FIG. 15 is a diagram illustrating a state in which a first dewarping area 1151 and a second dewarping area 1152 overlap each other.

As described above, a width of the dewarping area 115 varies according to magnification of a corrected image 112, that is, a zoom value. As the corrected image 112 is zoomed in, the width of the dewarping area 115 is decreased, and as the corrected image 112 is zoomed out, the width of the dewarping area 115 is increased.

For the same area, the user may require both of the corrected image 112 zoomed in for detailed viewing and the corrected image 112 zoomed out to secure a wide angle of view. In this case, since the zoom values of the two corrected images 112 are different from each other, widths of the first and second dewarping areas 1151 and 1152 are different from each other. However, since the first and second dewarping areas 1151 and 1152 correspond to the same area in an original image 111, the centers thereof approximately match each other. Consequently, as shown in FIG. 15, the second dewarping area 1152 is included inside the first dewarping area 1151.

When the user selects the second dewarping area 1152 included in the first dewarping area 1151, it may not be clear whether the user selects the first dewarping area 1151 or the second dewarping area 1152. Thus, the user may move the first dewarping area 1151 having a wider width to another area by dragging, and then may select the second dewarping area 1152. Thereafter, the first dewarping area 1151 may be moved back to its original position. However, in this method, there is an inconvenience that the user has to perform an unnecessary operation in order to select the second dewarping area 1152.

Figure 16:
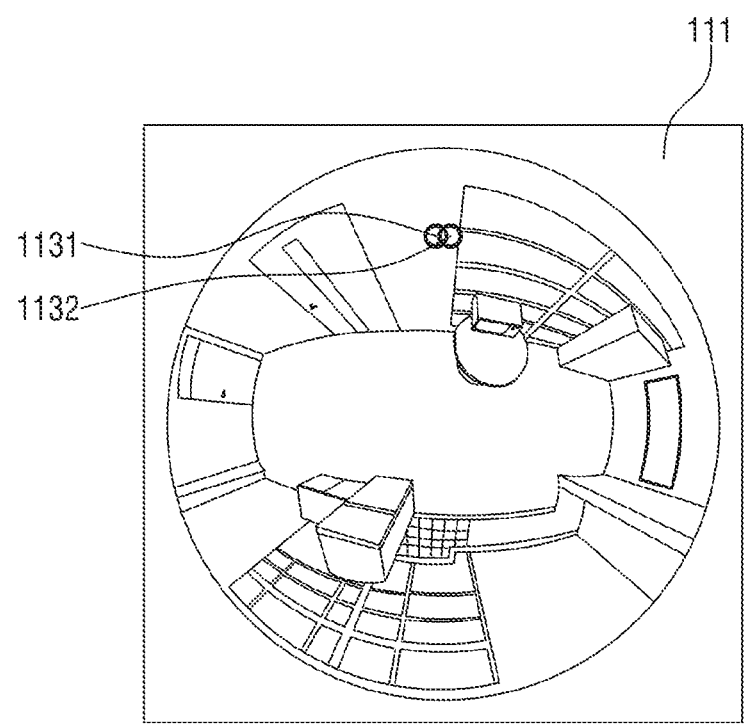
FIG. 16 is a diagram illustrating a state in which a first icon and a second icon overlap each other according to an example embodiment.
Figure 17:
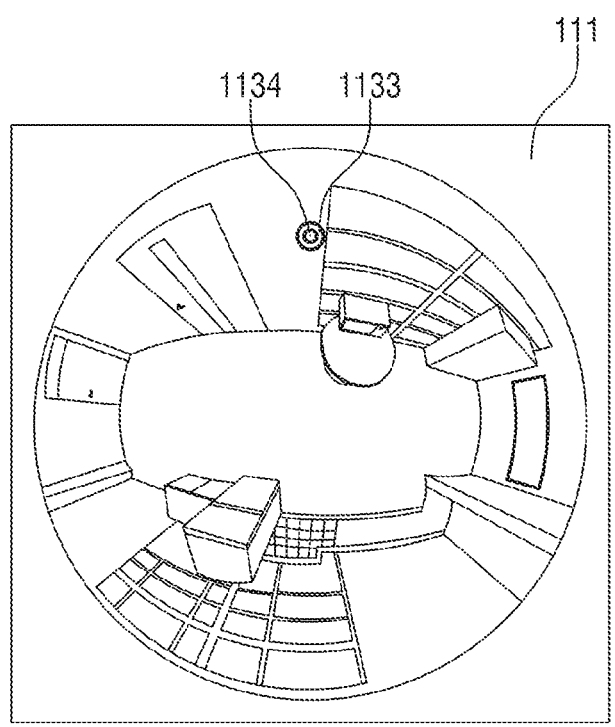
FIG. 17 is a diagram illustrating a state in which a first icon and a second icon overlap each other according to an example embodiment.
Figure 18:
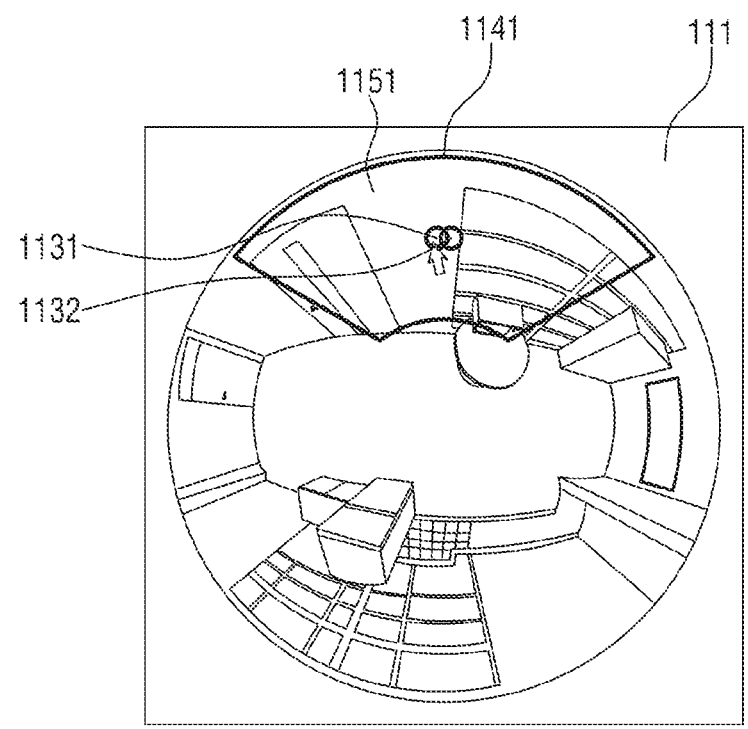
FIG. 18 is a diagram illustrating a state in which a first icon is selected according to an example embodiment.
Figure 19:
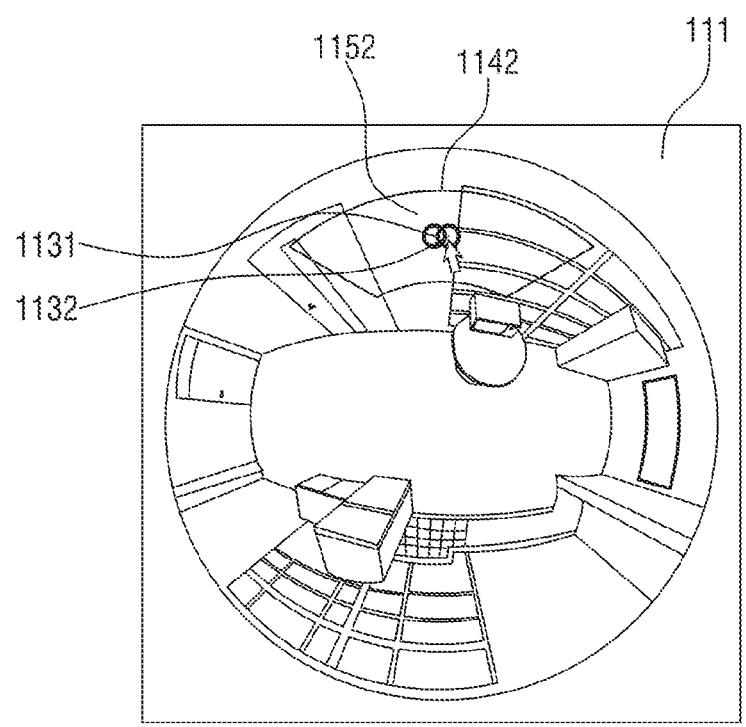
FIG. 19 is a diagram illustrating a state in which a second icon is selected according to an example embodiment.

FIG. 16 is a diagram illustrating a state in which a first icon 1131 and a second icon 1132 overlap each other according to an example embodiment, and FIG. 17 is a diagram illustrating a state in which a first icon 1131 and a second icon 1132 overlap each other according an example embodiment. FIG. 18 is a diagram illustrating a state in which a first icon 1131 is selected according to an example embodiment, and FIG. 19 is a diagram illustrating a state in which a second icon 1132 is selected according to an example embodiment.

According to an example embodiment, when a second dewarping area 1152 is included inside a first dewarping area 1151, the first icon 1131 located in the first dewarping area 1152 and the second icon 1132 located in the second dewarping area 1152 are displayed adjacent to each other. In this case, the first icon 1131 and the second icon 1132 may be spaced apart from each other by a certain distance, may touch each other at one point, or overlap each other at two points or more as shown in FIG. 16.

According to an example embodiment, as shown in FIG. 17, two icons 1133 and 1134 may have different sizes so that one icon 1133 may include the other icon 1134. In this case, the size of the icon 1133 may change in proportion to the width of a dewarping area 115. That is, since a first dewarping area 1151 having a wider width includes a second dewarping area 1152, the first icon 1133 may be larger than the second icon 1134 and displayed as including the second icon 1134.

According to an example embodiment, when the user performs a mouseover in order to select the first icon 1131, only the first dewarping area 1151 is selected as shown in FIG. 18. Then, to show this event to the user, a first polygon 1141 surrounding the first dewarping area 1151 is displayed. When the user performs the mouseover in order to select the second icon 1132, only the second dewarping area 1152 is selected as shown in FIG. 19. To show this event to the user, a second polygon 1142 surrounding the second dewarping area 1152 is displayed. In the above manner, the user may easily select the first dewarping area 1151 and the second dewarping area 1152 even when the second dewarping area 1152 is included inside the first dewarping area 1151.

According to an example embodiment, colors of the first and second icons 1131 and 1132 may set to be different from each other. In addition, colors of the first and second polygons 1141 and 1142 surrounding the first and second dewarping areas 1151 and 1152 may be set to be different from each other. In this case, the color of the first icon 1131 and that of the first polygon 1141 may be identical to each other and the color of the second icon 1132 and that of the second polygon 1142 may be identical to each other.

While one or more example embodiments have been described with reference to the figures, it will be understood by one of ordinary skill in the art that various changes in form and details may be made therein without departing from the spirit and scope of the disclosure as defined by the following claims.

The invention claimed is:

1. A monitoring apparatus comprising:
a communication interface configured to receive an original image acquired by a camera;
a storage configured to store the original image;
a display configured to display the original image and plurality of a corrected image obtained by dewarping the original image, wherein the original image includes a plurality of dewarping areas, each dewarping area corresponding to each of a plurality of corrected images; and
a controller configured to control the communication interface, the storage, and the display,
wherein the display is further configured to:
display a plurality of icons in the original image, wherein each of the plurality of icons is located in each dewarping area;
select, in response to an icon being selected among the plurality of icons, the dewarping area in which the icon is located and the corrected image corresponding to the dewarping area; and
display a polygon surrounding the selected dewarping area,
wherein a number of icons is the same as a number of the corrected images.

2. The monitoring apparatus of claim 1, wherein the display is further configured to display a shading on an area of the original image except the selected dewarping area.

3. The monitoring apparatus of claim 1, wherein the display is further configured to display the original image disposed at one side of the display and the plurality of corrected images disposed another other side of the display.

4. The monitoring apparatus of claim 1, wherein, when a first dewarping area comprises a second dewarping area, the display is further configured to display a first icon located in the first dewarping area and a second icon located in the second dewarping area, the first icon and the second icon overlapping at one or more points.

5. The monitoring apparatus of claim 1, wherein, when a first dewarping area comprises a second dewarping area, the display is further configured to display a first icon located in the first dewarping area, the first icon comprising a second icon located in the second dewarping area.

6. The monitoring apparatus of claim 1, wherein the icon is selected by a mouseover when the monitoring apparatus allows an input through a mouse, and is selected by tapping when the monitoring apparatus provides a touch function.

7. The monitoring apparatus of claim 6, wherein the display is further configured to display a polygon surrounding another dewarping area adjacent to the selected dewarping area in response to the icon being selected and held by at least one of the mouseover and the tapping.

8. The monitoring apparatus of claim 1, wherein, in response to the icon being selected, the display is further configured to display the polygon and not display the selected icon.

9. A monitoring system comprising:
a fisheye camera configured to acquire an original image; and
a monitoring apparatus configured to receive and display the original image acquired by the fisheye camera,
wherein the monitoring apparatus comprises:
a communication interface configured to receive the original image acquired by the fisheye camera;
a storage configured to store the original image;
a display configured to display the original image and a plurality of corrected images obtained by dewarping the original image, wherein the original image includes a plurality of dewarping areas, each dewarping area corresponding to each of the plurality of corrected images; and
a controller configured to control the communication interface, the storage, and the display,
wherein the display is further configured to display a plurality of icons in the original image, each icon being located in each dewarping area, select, in response to an icon being selected among the plurality of icons, the dewarping area in which the icon is located and the corrected image corresponding to the dewarping area, and display a polygon surrounding the selected dewarping area,
wherein a number of icons is the same as a number of the corrected images.

10. The monitoring system of claim 9, wherein the display is further configured to display a shading on an area of the original image except the selected dewarping area.

11. The monitoring system of claim 9, wherein, in response to the icon being selected, the display is further configured to display a shading on the plurality of corrected images except a corrected image corresponding to the selected dewarping area.

12. The monitoring system of claim 9, wherein, when a first dewarping area comprises a second dewarping area, the display is further configured to display a first icon located in the first dewarping area and a second icon located in the second dewarping area, the first icon and the second icon overlapping at one or more points.

13. The monitoring system of claim 9, wherein:
the icon is selected by a mouseover when the monitoring apparatus allows an input through a mouse; and
when the icon is clicked and held by the mouse, the display is further configured to display a polygon surrounding another dewarping area adjacent to the selected dewarping area.

14. The monitoring apparatus of claim 2, wherein the display is further configured to display a border surrounding a corrected image corresponding to the selected dewarping area.

15. The monitoring apparatus of claim 2, wherein the display is further configured to display a shading on the plurality of corrected images except a corrected image corresponding to the selected dewarping area.

16. The monitoring system of claim 10, wherein the display is further configured to display a border surrounding a corrected image corresponding to the selected dewarping area.

17. The monitoring system of claim 9, wherein, in response to the icon being selected, the display is further configured to display the polygon and not display the selected icon.

18. The monitoring system of claim 9, wherein a direction of the selected icon corresponds to an orientation of a corrected image corresponding to the selected dewarping area.

* * * * *